United States Patent
Wortham (10) Patent No.: US 7,228,139 B1
(45) Date of Patent: Jun. 5, 2007

(54) LOCATION PROCESSING SYSTEM

(75) Inventor: Larry C. Wortham, Garland, TX (US)

(73) Assignee: On-Board Communications, Inc., Dallas, TX (US)

( * ) Notice: Subject to any disclaimer, the term of this patent is extended or adjusted under 35 U.S.C. 154(b) by 151 days.

(21) Appl. No.: 10/766,054

(22) Filed: Jan. 28, 2004

(51) Int. Cl.
*H04Q 7/20* (2006.01)

(52) U.S. Cl. ............................... 455/456.1; 455/456.3; 455/404.2

(58) Field of Classification Search .. 456/456.1–456.6, 456/457, 404.2; 379/67.1, 77; 340/531, 340/825.36, 825.49; 342/450, 457, 463; 455/404.1
See application file for complete search history.

(56) References Cited

U.S. PATENT DOCUMENTS

| | | | | |
|---|---|---|---|---|
| 3,906,166 A * | 9/1975 | Cooper et al. | ............... | 455/437 |
| 4,056,781 A * | 11/1977 | Hetebrij et al. | ............ | 340/7.21 |
| 4,353,502 A * | 10/1982 | Myers | ......................... | 236/47 |
| 4,517,410 A * | 5/1985 | Williams et al. | .............. | 379/73 |
| 4,554,542 A * | 11/1985 | Dolikian | ................ | 340/825.76 |
| 4,651,156 A * | 3/1987 | Martinez | .................... | 342/457 |
| 4,747,126 A * | 5/1988 | Hood et al. | .................... | 379/74 |
| 5,225,842 A | 7/1993 | Brown et al. | ................ | 342/357 |
| 5,327,580 A * | 7/1994 | Vignali et al. | .............. | 455/701 |
| 5,689,270 A * | 11/1997 | Kelley et al. | .......... | 342/357.09 |
| 6,035,202 A * | 3/2000 | Camp, Jr. | ................. | 455/456.1 |
| 6,181,253 B1 * | 1/2001 | Eschenbach et al. | ... | 340/825.37 |
| 6,239,748 B1 * | 5/2001 | Gilhousen | .................... | 342/442 |
| 6,263,047 B1 * | 7/2001 | Randle et al. | ................ | 379/31 |
| 6,362,778 B2 * | 3/2002 | Neher | .................... | 342/357.07 |
| 6,445,802 B1 * | 9/2002 | Dan | ........................... | 381/104 |
| 6,516,198 B1 | 2/2003 | Tendler | ...................... | 455/456 |
| 6,580,914 B1 * | 6/2003 | Smith | ....................... | 455/456.6 |
| 6,643,516 B1 * | 11/2003 | Stewart | ................... | 455/456.6 |
| 6,697,018 B2 * | 2/2004 | Stewart | ...................... | 342/386 |
| 6,836,651 B2 | 12/2004 | Segal et al. | ................. | 455/405 |
| 6,836,653 B1 * | 12/2004 | Kang | ...................... | 455/408 |
| 2002/0070881 A1 | 6/2002 | Marcarelli et al. | .......... | 340/988 |
| 2002/0090973 A1 * | 7/2002 | Tendler | ...................... | 455/552 |
| 2004/0001518 A1 * | 1/2004 | Gilbert et al. | ............. | 370/525 |
| 2004/0029557 A1 * | 2/2004 | Pugliese | .................. | 455/404.2 |
| 2004/0030494 A1 * | 2/2004 | Hull | .......................... | 701/208 |
| 2004/0176106 A1 * | 9/2004 | Tendler | ................... | 455/456.5 |
| 2004/0198386 A1 * | 10/2004 | Dupray | .................... | 455/456.1 |
| 2004/0254985 A1 * | 12/2004 | Horstemeyer | ............... | 709/205 |

* cited by examiner

*Primary Examiner*—Jean Gelin
(74) *Attorney, Agent, or Firm*—Baker Botts L.L.P.

(57) ABSTRACT

A device for determining the location of a communication device includes a network interface, a signal enhancement module, a tone decoder, and a translator. The network interface is capable of receiving a location message comprising a plurality of signal tones. The signal enhancement module is capable of modifying selected signal tones, the selected signal tones having a frequency within a predetermined range of frequencies. The tone decoder is capable of decoding the modified signal tones into a plurality of decoded values. The translator is capable of determining a location of a user based on at least the decoded values.

24 Claims, 4 Drawing Sheets

LOCATION PROCESSING SYSTEM

TECHNICAL FIELD OF THE INVENTION

This invention relates in general to mobile communication, and more particularly to a method and system for locating a mobile communication device.

BACKGROUND OF THE INVENTION

The Federal Communication Commission's ("FCC") enhanced 911 ("E911") initiative strives to improve the emergency call service by providing a mobile telephone user's identification and physical location during a call. To that end, the FCC issued a mandate requiring the communication industry to modify the existing wireless communication architecture and associated wireless phones so that the wireless caller's location may be ascertained by an emergency service provider. However, many proposed solutions for adding this functionality involve costly and protracted modifications to existing mobile communication infrastructure. Additionally, many proposed solutions require users to operate complicated devices that may be impractical during an emergency or while the user is driving. Consequently, a system is desired for providing the location of a mobile telephone user that requires minimal modification of existing mobile communication infrastructure and that is easy for the user to operate.

SUMMARY OF THE INVENTION

In accordance with the present invention, the disadvantages and problems associated with mobile communication have been substantially reduced or eliminated. In particular, the invention provides a method and system for locating a user of a mobile communication device that can be implemented with little modification to existing communication infrastructure.

In accordance with one embodiment of the present invention, a method for determining the location of a position locator includes a receiving at a position locator a location request from a user; determining a location of the position locator in response to receiving the location request; indicating to a user that the location of the position locator has been determined; receiving at the position locator a transmission request from a user; generating a location message in response to the transmission request, wherein the location message comprises audio signals that encode the location of the position locator.

In accordance with another embodiment of the present invention, a position locator for determining the location of a user comprising a housing. The housing encloses a power supply, a location communicator, and a processor. The power supply is capable of supplying power to the position locating device. The location communicator is capable of communicating audio signals. The processor is capable of receiving a location request from a user, determining a location of the position locator, indicating to a user that the location has been calculated, receiving a transmission request; and instructing the location communicator to communicate a location message in response to the transmission request, wherein the location message comprises audio signals that encode the location of the position locator; and Important technical advantages of certain embodiments of the present invention include providing a location system that can be implemented utilizing elements of conventional mobile communication system. Other advantages include an easy to use location device that allows the user greater control over transmission of location information. Certain embodiments also provide power-saving advantages.

Other technical advantages of the present invention will be readily apparent to one skilled in the art from the following figures, descriptions, and claims. Moreover, while specific advantages have been enumerated above, various embodiments may include all, some, or none of the enumerated advantages.

DETAILED DESCRIPTION OF THE INVENTION

Figure 1:
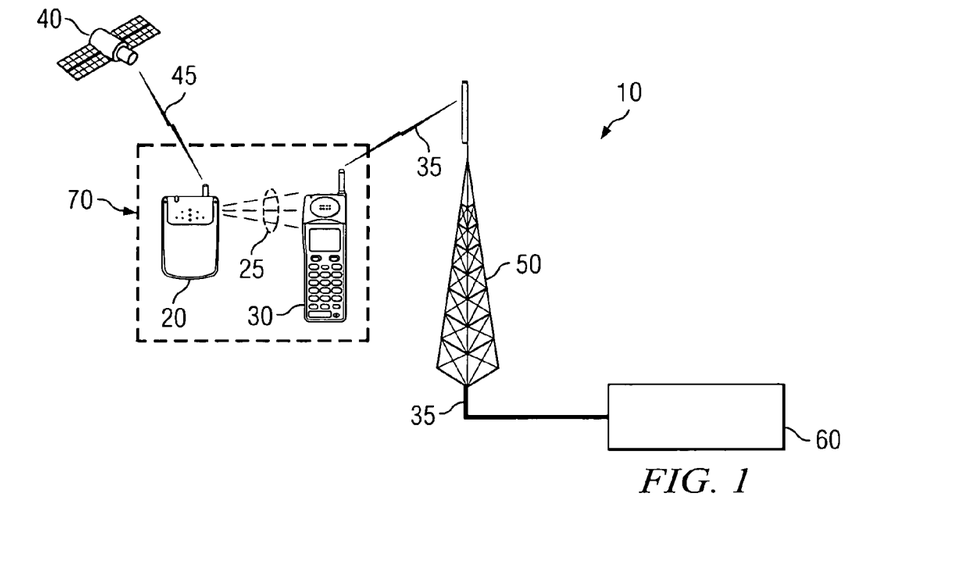
FIG. 1 illustrates a system for determining the location of a user of a position locator.

FIG. 1 illustrates a particular embodiment of a system 10 for determining a location of a user 70. System 10 includes a position locator 20, a communication device 30, a positioning system 40, a mobile communication network 50, and an operator facility 60. Position locator 20 uses information received from positioning system 40 to determine the location of position locator 20, and communicates this location to communication device 30. Communication device 30 then transmits this information to operator facility 60 through mobile communication system 40. Operator facility 60 subsequently processes the information for use by a service provider.

Figure 2:
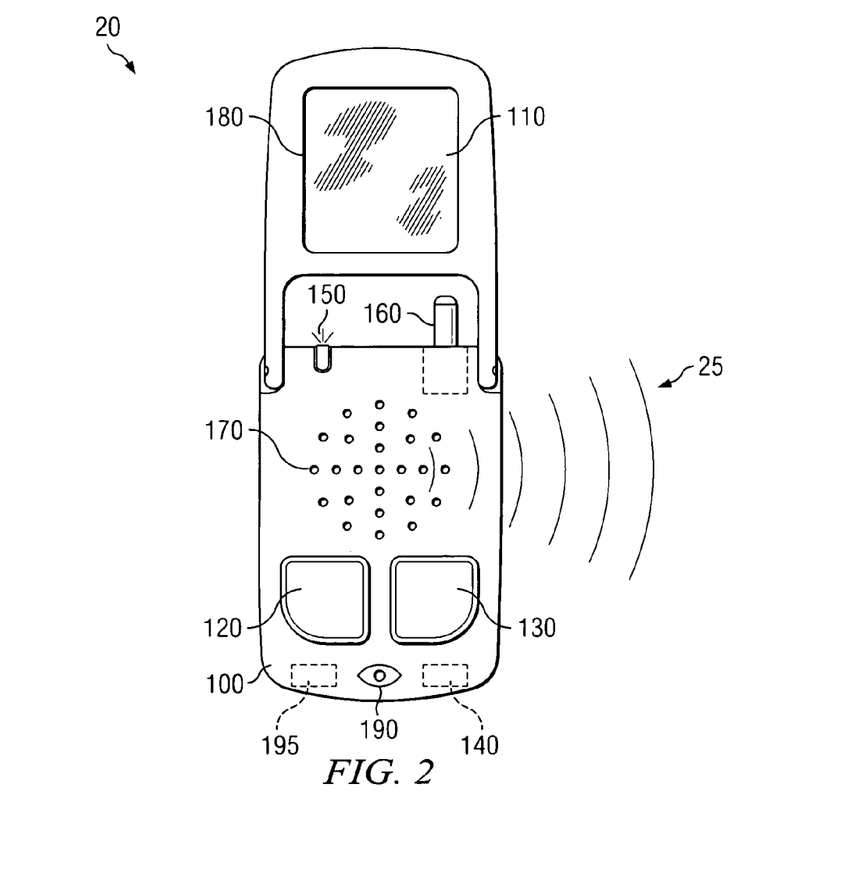
FIG. 2 illustrates a position locator according to a particular embodiment.

Position locator 20 receives position signals 45 broadcast by positioning system 40 and, based on information in position signals 45, generates a location message 25 for communication to operator facility 60. Position locator 20 includes any appropriate combination of software and/or hardware for providing the functionality described below. FIG. 2 provides a more detailed illustration of one embodiment of position locator 20.

Communication device 30 may be any portable device that allows user 70 to communicate with another party over mobile communication network 50. Examples of mobile communication device 30 include, but are not limited to, a cellular telephone, a radio telephone, a pager, or any other mobile device operable to support wireless communication.

Positioning system 40 broadcasts location information to be utilized by positioning devices such as position locator 20. Positioning system 40 may include satellites, directional antennas, and/or any other appropriate space-based or terrestrial elements for locating position locator 20. In a particular embodiment, one or more elements of positioning system 40 broadcast a position signal 45 that includes the location of that element and the time the signal was broadcast. Appropriately configured devices, such as position locator 20, may receive position signals 45 from one or more elements of positioning system 40 and use the location and time information to calculate the location of position locator 20. Examples of positioning system 40 include, but are not limited to, the Global Positioning System ("GPS"), Galileo, Glonass, and Loran.

Mobile communication network 50 receives location information transmissions from communication device 30 and transmits this location information to operator facility 60. Mobile communication network 50 may include antennas, switching offices, and any other suitable communication components. Mobile communication network 50 is capable of communicating voice and/or data with communication device 20 according to Code Division Multiple Access (CDMA), Time Division Multiple Access (TDMA), or any other appropriate analog, digital, circuit-switched, or packet-switched communication protocol. In a particular embodiment, mobile communication network 50 supports a voice channel that can communicate dual tone multifrequency (DTMF) or other forms of signals to transmit information.

Operator facility 60 processes location information communicated by communication device 60 and provides location information to a service provider or other suitable party or entity. Operator facility 60 may provide user 70 with access to a human or computerized operator capable of communicating with user 70 and prompting user 70 to provide location information at an appropriate time. Operator facility 60 may be centralized or distributed, and may operate with or without human interaction. The precise operation of operator facility 60 depends on the configuration and characteristics of system 10. In a particular embodiment, operator facility 60 receives dual-tone multi-frequency (DTMF) signals carrying the location of the user and converts the DTMF information into a latitude and longitude in a format appropriate for use by an emergency service provider.

In operation, user 70 indicates a desire to determine the location of position locator 20 by requesting that position locator 20 calculate the position. User 70 may request the calculation in a variety of ways depending on the configuration of position locator 20. In a particular embodiment, as illustrated in FIG. 2, user 70 requests the calculation by pressing a button located on a housing of position locator 20.

In response to the calculation request, position locator 20 attempts to locate one or more position signals 45 broadcast by elements of positioning system 40. The manner in which position locator 20 locates the position signals 45 also depends on the configuration and characteristics of system 10. In a particular embodiment, positioning system 40 represents a Global Positioning System (GPS) that includes several satellites capable of broadcasting their location along with an accurate time of broadcast in a positioning signal. In this embodiment, position locator 20 locates position signals 45 by polling for signals being broadcast by various satellites.

Position locator 20 may, under certain circumstances, have difficulty locating position signals 45 broadcast by positioning system 40. For example, the orientation, location, or surrounding environment of position locator 20 may cause difficulties in receiving signals of the type used by positioning system 40. As a result, position locator 20 may be configured to provide information for a user of position locator 20 to improve the ability of position locator 20 to communicate with positioning system 40.

After position locator 20 locates one or more position signals 45, position locator 20 extracts information from position signals 45 and uses the information to determine the location of position locator 20. The location may represent the latitude and longitude of position locator 20, information describing the location of position locator 20 relative to a fixed geographic point of reference, driving directions to position locator 20 from the location of an emergency service provider, or any other appropriate form of location. The process by which position locator 20 determines the location depends on the configuration of positioning system 40. In the embodiment discussed above, positioning system 40 represents a GPS system. In such an embodiment, each position signal 45 may include information identifying a satellite that broadcast position signal 45 and the time position signal was broadcast. Position locator 20 then obtains from a memory of position locator 20 orbital data for the satellite broadcasting the particular position signal 45. Based on the orbital data, the broadcast time of position signal 45, and the time at which position locator 20 received position signal 45, position locator 20 then calculates the location of position using conventional GPS techniques.

At some point, before, after, or contemporaneous with requesting the calculation, user 70 establishes a wireless communication link 35 with operator facility 60 on mobile communication network 50 using communication device 30 and initiates a communication session 55. Wireless communication link 35 may represent a call to "911", a roadside mechanic service, a service providing driving directions, or any other emergency or travel service. As indicated above, operator facility 60 may include a human or computerized operator. Through communication session 55, user 70 can interact with this operator and provide appropriate information to the operator, such as a description of the services requested. Additionally, the operator may prompt user 70 at the appropriate time to communicate location message 25.

After determining the location, position locator 20 may activate a location indicator to notify user 70 that position locator 20 is ready to generate location message 25. Once position locator 20 has activated the location indicator or otherwise notified user 70 that position locator 20 has calculated the location, user 70 or operator facility 60 may request transmission of location message 25. User 70 or operator facility 60 may request transmission of location message 25 in a variety of ways. In a particular embodiment, user 70 may request transmission of location message 25 by pressing a button located on a housing of position locator 20. In another embodiment, position locator 20 is capable of receiving audio tones. In such an embodiment, operator facility 60 may request communication of the location message 25 by transmitting signals to position locator 20 through communication device 30. For example, operator facility 60 may broadcast signals through communication device 30 in an appropriate acoustic format, such as DTMF, or wireless format, such as Bluetooth or 802.11, to prompt position locator 20 to communicate location message 25.

By allowing user 70 to choose when position locator 20 communicates location message 25, particular embodiments may provide a number of benefits. User 20 may be able to wait until a suitable point in conversation with an operator of operator facility 60 before triggering communication of location message 25. For example, user 20 may wait until prompted by the operator before requesting transmission of location message 25. Additionally, user 70 may be able to position locator 20 and/or communication device 30 to optimize transmission before triggering communication of location message 25. For example, in a particular embodiment, communication device 30 represents a mobile phone and position locator 20 represents a device mounted on the inside of an automobile windshield. In such an embodiment, user 70 may be able to raise the mobile phone to position locator 20 before requesting location message 25.

After position locator 20 receives the transmission request, position locator 20 communicates location message 25 to communication device 30. Location message 25 identifies the location of position locator 20 and may be in any form understandable by communication device 30. Location message 25 may also include other information that may be useful to an emergency service provider, such as the velocity or altitude of position locator 20. Additionally, location message 25 may include error-checking data, such as checksums, to facilitate error checking by operator facility 60.

Furthermore, position locator 20 may communicate location message 25 in any appropriate manner. For example, in particular embodiments, position locator 20 includes a speaker capable of generating audio tones. In such an embodiment, position locator 20 may use DTMF or other suitable signaling to communicate the location. DTMF signaling is a signaling method that uses audio tones to transmit information. Using this method, information is translated into a string of values, each value associated with one of sixteen tone pairs. A DTMF generator produces, in turn, the tone pair for each of the values. A DTMF decoder receives the tone pairs and converts the tone pairs by determining a plurality of decoded values, each value representing the value associated with one of the tone pairs. A translator then translates decoded values to produce the original information. A common example of DTMF signaling is touch-tone dialing used in conventional telephone systems.

Communication device 30 receives location message 25 and transmits location message 25 to operator facility 60 on mobile communication network 50 using conventional mobile communication techniques. In a particular embodiment, position locator 20 establishes a voice channel in a conventional manner, thus allowing position locator 20 to operate without modifications or additions to the existing cellular infrastructure or position systems. More specifically, by using DTMF on the conventionally established voice channel, such embodiments provide location services without changes to communication device 30, positioning system 40, or mobile communication system 50.

Figure 5:
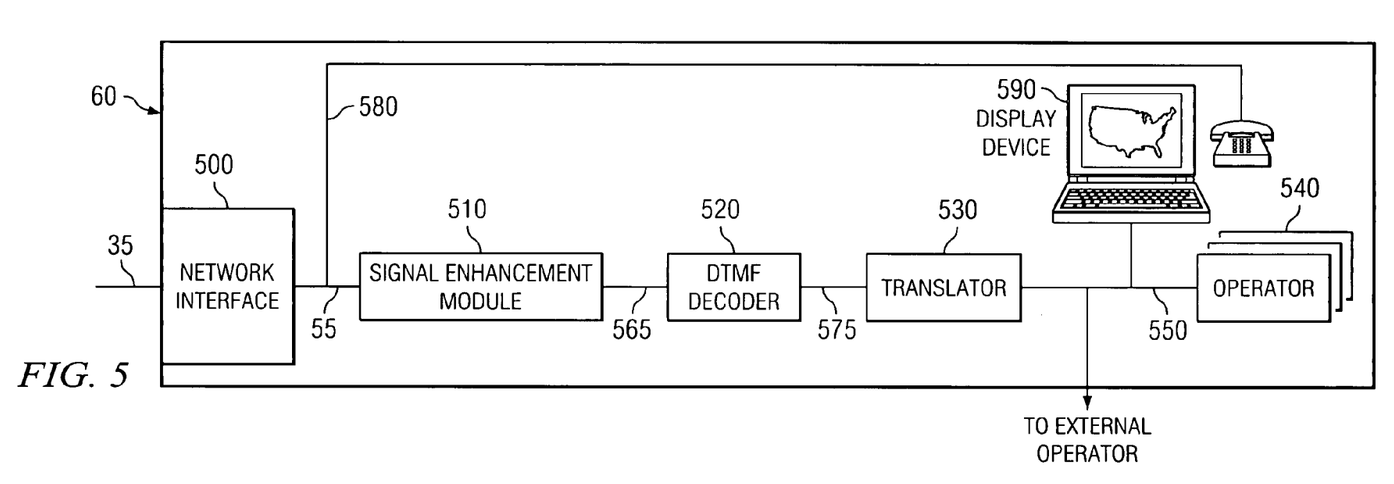
FIG. 5 is a block diagram showing the contents of an operator facility according to a particular embodiment.
Figure 6:
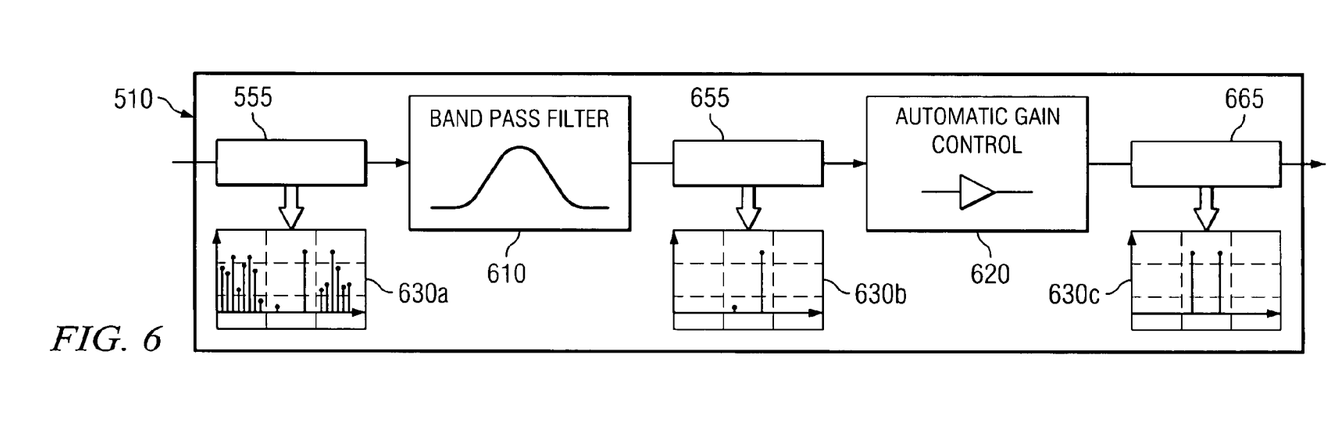
FIG. 6 is a block diagram showing the contents of a signal enhancement module according to a particular embodiment.

Particular embodiments of operator facility 60 may pre-process location message 25 to improve recognition or use of the information in location message 25, such as by filtering, amplifying, or otherwise modifying the information of location message 25. In general, operator facility 60 may pre-process location message 25 in any appropriate manner based on the characteristics and configuration of system 10. A more detailed example of this pre-processing in a particular embodiment of system 10 is illustrated in FIGS. 5–6.

After any appropriate pre-processing, operator facility 60 extracts information from location message 25 identifying the location of user 70 and provides this information to an operator or external service provider. As suggested above, operator facility 60 may provide this information in a variety of manners depending on the characteristics and requirements of system 10. As a few examples, operator facility 60 may transmit a latitude and longitude pair, driving directions to the location of user 70, or directional vectors indicating the location of user 70 relative to the location of the emergency service provider. In general, operator facility 60 can supply an operator or external service provider with the location of user 70 in any appropriate form and using any appropriate process. For example, particular embodiments of operator facility 60 may process location message 25 to generate a latitude and a longitude in a common industry format, such as that defined by National Marine Electronics Association Standard 1083 (NMEA-1083), a SiRF-compatible format, or any other appropriate format, that may be fed into a computerized dispatch system for an emergency service provider. Other embodiments may process location message 25 to generate a graphic indication of the location of user 70 on a computerized map to allow a human dispatcher to direct a service provider to user 70.

While the illustration and the preceding description focus on a particular embodiment of system 10 that includes specific elements providing particular functions, system 10 contemplates individual components having any suitable combination and arrangement of elements capable of locating user 70 and communicating the location to a service provider. Thus, the functions performed by the particular elements illustrated may be separated or combined as appropriate. Additional elements may also be included if appropriate in a particular embodiment of system 10. For example, mobile communication network 50 may couple to a landline communication network that couples to operator facility 60 and facilitates communication between mobile communication network 50 and operator facility 60.

FIG. 2 is a block diagram providing a more detailed illustration of position locator 20 according to a particular embodiment. In this embodiment, position locator 20 includes a housing 100, a housing door 110, a first button 120, a second button 130, a power source 140, a location indicator 150, a location receiver 160, a location communicator 170, a microphone 190, and a memory 195. Alternative embodiments of position locator 20 may include any or none of these components as appropriate.

Figure 3:
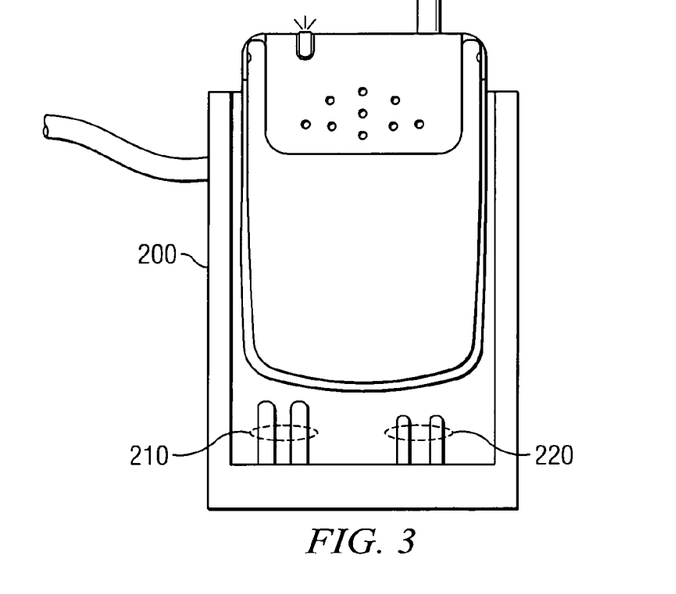
FIG. 3 illustrates a cradle configured to hold a particular embodiment of the position locator.

Housing 100 holds the various components of position locator 20 and, in particular embodiments, is configured to allow for mounting or for placement in a cradle, such as the one shown in FIG. 3. Housing may be composed of any appropriate material such as plastic, aluminum, or any other suitable material. In a particular embodiment, housing 100 may be shaped and composed of materials to allow user 70 to carry and/or use position locator 20 in a pocket, purse, briefcase or any other appropriate container. Housing 100 may also include any suitable mechanical, magnetic, or adhesive mounting elements to affix position locator 20 to a windshield, dashboard, or other suitable surface of a vehicle.

Housing door 110 covers a face of housing 100 and may attach to housing 100 by hinges, slides, or any other suitable components. In the illustrated embodiment, housing door 110 also prevents first button 120 and second button 130 from being depressed while housing door 110 is closed. Housing door 110 may be configured to cover any appropriate components of position locator 20 and may be composed of the same material as housing 100 or any suitable alternative. Additionally, functionality may be assigned to the various positional states of housing door 110. For example, in the illustrated example, opening housing door 110 activates power source 140 of position locator 20 and causes position locator 20 to begin searching for components of positioning system 40. Closing housing door 110 may deactivate power source 140. Furthermore, operating instructions 180 for position locator 20 may be written on the inside of housing door 110 and may be visible when housing door 110 is open.

First button 120 and second button 130 allow user 70 to interact with position locator 20. Although FIG. 2 shows a position locator 20 that includes two buttons, a particular embodiment of position locator 20 may include one or any number of buttons offering any appropriate functionality based on the operation of the particular embodiment. For example, in the illustrated embodiment, position locator 20 is configured so that user 70 depresses first button 120 to determine the location of position locator 20, and depresses second button 130 to communicate location message 25. Furthermore, multiple functions may be assigned to a single button of position locator 20 to be executed based on the number of times the button is pressed. For example, in a particular embodiment, user 70 may depress a button a first time to determine the location of position locator 20 and depress the same button a second time to communicate location message 25.

Power source 140 may represent a power supply internal to position locator 20 or a component for coupling to an appropriate power supply external to position locator 20. For example, power source 140 may represent a battery, solar panel, or other internal power supply. Alternatively, power source 140 may represent a contact wired to a plug configured for use in an alternating-current power outlet external to position locator 20. Position locator 20 may be configured so that power source 140 is activated or deactivated based on the state of other components of position locator 20 such as housing door 110, first button 120, or second button 130. Additionally, although the illustrated embodiment includes only one power source 140, position locator 20 may include any suitable number of internal power supplies and/or components for coupling to external power supplies. Position locator 20 may include an internal power supply, such as a rechargeable battery, and components for coupling to an external power supply, such as a power cord configured for use with an AC power outlet, that may be used interchangeably.

Location indicator 150 notifies user 70 that position locator 20 has found appropriate elements of position system 40 and is ready to communicate a location message 25. Location indicator 150 may be any component capable of conveying this information to user 70. For example, location indicator may be a light bulb, a light emitting diode ("LED"), an audio tone generator, or any other suitable device configured to notify user 70 that position locator is ready to communicate location message 25.

Location receiver 160 receives position signals 45 from elements of positioning system 40. Location receiver 160 may represent an antenna, processor, memory, and/or other circuitry, or any other appropriate element or combination of elements for receiving position signals 45 from positioning system 40. Location receiver 160 may be capable of receiving radio signals, light signals, audio signals, or any other type of communication suitable for positioning system 40.

Location communicator 170 transmits location message 25 to communication device 30. Location communicator 170 may represent any elements capable of transmitting location message 25 in an appropriate format. In the illustrated embodiment, location communicator 170 represents a speaker operable to communicate audio tones, such as DTMF signals, to communication device 30.

Microphone 190 allows user 70 to interact with position locator 20 through voice and other audio signals. Microphone 190 may supplement or replace the functionality of first button 120 and second button 130 in particular embodiments of position locator 20. Additionally, microphone 190 may allow user 70 to store audio signals to memory 195, for example, to dictate notes while driving.

Memory 195 may store software to be executed by position locator 20, voice signals input to position locator 20, navigational data, or any other appropriate information to be provided or used by position locator 20. Memory 195 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

In operation, position locator 20 may assume a dormant state. Position locator 20 may assume a dormant state after a power down, after position locator 20 sits idle for a predetermined period of time, or at any other appropriate time. In this dormant state, position locator 20 may operate without power or at a reduced power level thereby extending the life of power source 140.

User 70 can initiate an active state in position locator 20 by opening housing door 110. The active state may represent an "on" or full power state. When user 70 initiates the active state, position locator 20 may begin searching for position signals 45. Alternatively, position locator 20 may wait until user 70 initiates a search state in position locator 20. For example, position locator 20 can wait until user 70 initiates the search state by pressing first button 120. Position locator 20 then begins searching for position signals 45 after user 70 has pressed first button 120.

Once position locator 20 receives the appropriate position signals 45 to determine its location, position locator 20 calculates the location using information included in position signals 45, as described above with respect to FIG. 1. If position locator 20 has difficulty finding position signals 45, position locator 20 may provide user 70 instructions or other information for improving reception of position signals 45. For example, position locator 20 may indicate that position locator 20 is not receiving position signals 45 at full strength because of an obstruction in the path of one or more position signals 45 and provide user 70 with suggestions for improving reception, such as placing position locator 20 on a car hood, flat on the hood, or in a different position. Additionally, position locator 20 may include a speaker capable of generating audio tones to mark the progress of the satellite acquisition sequence.

After position locator 20 has calculated the location, position locator 20 may activate location indicator 150. Location indicator 150 notifies user 70 that position locator 20 has finished calculating the location and that user 70 may now request location message 25. Depending on the configuration of position locator 20, location indicator 150 may deactivate immediately or may remain activated until user 70 requests location message 25.

After position locator 20 has activated location indicator 150 or has otherwise notified user 70, position locator 20 waits for a transmission request from user 70. At an appropriate point, user 70 requests transmission of location message 25. In various embodiments of position locator 20, user 70 may generate the location request in a variety of ways. In the illustrated embodiment, user 70 generates the location request by pressing second button 130. User 70 can wait until user 70 is prompted by operator facility 60, communication device 30 is properly positioned with respect to position locator 20, and/or any other suitable condition has been fulfilled before requesting location message 25. This feature may allow user 70 to delay communication of location message 25 until an appropriate time.

Once user 70 requests transmission of location message 25, position locator 20 communicates location message 25 to communication device 30 as described above with respect to FIG. 1. User 70 may choose to optimize this communication by positioning position locator 20 and communication device 30 appropriately. Position locator 20 may then immediately return to the dormant state or await further input from user 70. In the illustrated embodiment, position locator 20 remains in a post-transmission state until user 70 closes housing door 110 and then returns to the dormant state described above.

Particular embodiments of position locator 20 may include provide additional functionality. For example, a particular embodiment of position locator 20 may include a microphone 190 that allows user 70 to interact with position locator 20 using voice or other audio signals. As a result, user 70 may be able to record information, such as voice notes, in memory 195. Additionally, position locator 20 may be able to store location information with the audio signals, allowing user 70 to label and store location information for a geographic point of interest. Furthermore, position locator 20 may be configured to later provide driving or other directions to user 70 to guide user 70 back to the geographic point.

FIG. 3 illustrates a cradle 200 configured to hold position locator 20. In this embodiment, position locator 20 slides into cradle 200 and is capable of operating while positioned in cradle 200. Additionally, cradle 200 may include a connection 210 to an external power source and may be configured such that position locator 20 couples to the connection when resting in cradle 200. Cradle 200 may be configured so that user 70 has full access to any and all interface components of position locator 20 while position locator 20 is located in cradle 200.

Additionally, cradle 200 may include a data connection 220 such as a connection for a serial data port. Data connection 220 may also route information from a computer mapping program, for example, to be downloaded into a memory of position locator 20 and subsequently used to provided turn-by-turn directions to a driver during travel. Data connection 220 may also be used to update position software of position locator 20 or to upload trip log information.

Position locator 20 may be configured to operate while mounted differently from the manner illustrated in FIG. 3. For example, position locator 20 may be built into the dashboard of a vehicle and communicate with positioning system 40 and communication device 30 through an externally mounted antenna and a dashboard-mounted speaker, respectively. As another example, position locator 30 may be configured for operation independent of a vehicle and designed to travel in a pocket, briefcase, or purse.

Figure 4:
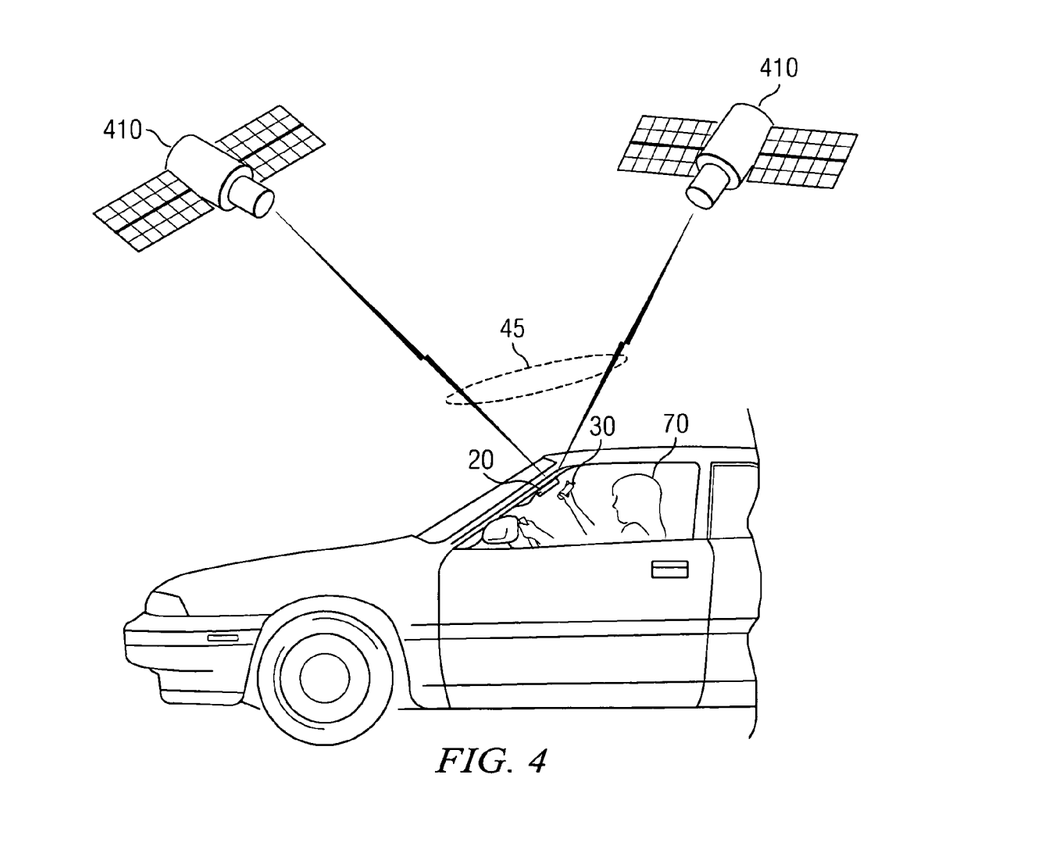
FIG. 4 illustrates a particular embodiment of the position locator in operation.

FIG. 4 illustrates a particular embodiment of position locator 20 in operation. Position locator 20 rests in cradle 200 which is mounted on a surface inside an automobile. The surface may represent a windshield, window, or dashboard of the automobile. Position locator 20 is capable of communicating with components of positioning system 40, such as satellites 410, through the transparent or translucent surface. Additionally, position locator 20 is capable of communicating with an appropriately positioned communication device 30 while in cradle 200.

FIG. 5 illustrates an operator facility 60 that receives a location message 25 communicated in DTMF format. Operator facility 60 includes a network interface 500, a signal enhancement module 510, a DTMF decoder 520, a translator 530, and an operator 540. Operator facility 60 establishes a wireless communication link 35 with communication device 30. Operator facility 60 then receives communication session 55, including location message 25, from communication device 30 and translates location message 25 to a format useable by operator 540 or an external service provider. Additionally, operator facility 60 may process communication session 55 that has been degraded, unprocessed session 555, to overcome various transmission problems.

Network interface 510 facilitates communication between operator facility 60, mobile communication network 50, and other telephony equipment, including possibly other communication networks. For example, network interface 510 may be configured to allow operator 540 to receive unprocessed session 555 from mobile communication network 50 and to communicate information on the location of user 70 to an emergency service provider over a landline network. In general, network interface 500 may include any combination of hardware and/or software suitable for providing the functionality described below. Additionally, although the illustrated embodiment includes only one network interface 500, particular embodiments may include any number of network interfaces 500 configured to communicate with various communication networks.

Signal enhancement module 510 modifies unprocessed session 555 to compensate for signal degradation that occurs to location message 25 during transmission from position locator to operator facility 60 and outputs processed session 565. In general, signal enhancement module 510 may be configured to compensate for the degradation or alteration of the amplitude, phase, shape, and/or any other appropriate characteristics of signals included in location message 25. Signal enhancement module 510 may include any combination of software and/or hardware appropriate for reducing or eliminating the particular types of degradation experienced by system 10. For example, signal enhancement module 510 includes automatic gain control circuitry that normalizes the volume of audio signals in unprocessed session 555 for which the frequency is within the voiceband (300–350 Hz).

DTMF decoder 520 detects DTMF information included in processed session 565 and converts the DTMF to a format comprehensible by translator 530. Additionally, DTMF decoder 520 may block out non-DTMF information transmitted in processed session 565, passing along only DTMF information as decoded values. DTMF decoder 520 may include any appropriate hardware and/or software for detecting DTMF information in modified location message 25. In a particular embodiment, DTMF decoder 520 represents a soundcard or other hardware installed in a personal computer.

Translator 530 receives location information from DTMF decoder 520 and uses the location information to generate a location output 550 indicating the location of user 70. Translator 530 may generate location output 550 in any format suitable for system 10, such as that defined by National Marine Electronics Association Standard 1083 (NMEA-1083), a SiRF-compatible format, or any other appropriate format. Translator 530 may also output location output 550 to a display device 590, such as a computer map, which provides the information to operator 540 in a convenient format.

Operator 540 receives communication session 55 from network interface 500 and utilizes information from communication session 55 and location output 550 to provide emergency services, directions, roadside assistance, or any other appropriate services to user 70. Operator 540 may represent a human operator or computerized components capable of performing the functions described. In the illustrated embodiment, operator 540 represents a human dispatcher, such as a "911" operator, capable of contacting emergency service providers and supplying them with the location of user 70. In other embodiments, operator 540 may represent hardware and/or software components capable of using location information communicated by position locator 20 to facilitate the provision of emergency, roadside, or other services to user 70. Additionally, although the illustrated embodiment shows a system 10 that includes a single operator 540, system 10 may be configured to include any appropriate number of operators 540.

In operation, network interface 500 receives unprocessed session 555 from mobile communication network 50. Network interface may interact with mobile communication system 50 in any suitable manner to facilitate receipt of unprocessed session 555. In the illustrated embodiment, network interface 500 then transmits unprocessed session 555 to signal enhancement module 510. In the illustrated embodiment, network interface 500 also transmits unprocessed session 55 directly to operator 540 as shown by voice connection 580. This allows operator 540 to interact with user 70 prior to, during, and/or after receiving location message 25. For example, operator 540 may be able to speak to user 70 to determine the type of emergency services needed by user 70, to identify the intended destination of user 70, or to prompt the user 70 to generate location message 25 at the appropriate time.

During transmission through system 10, location message 25 may become degraded for a variety of reasons. For example, if position locator 20 generates location message 25 as audio signals that are broadcast to communication device 30, transmission through the air between position locator 20 and communication device 30 may cause signal degradation to location message 25. Additionally, background noise, human speech, or other audio signals may further degrade location message 25. This degradation may prevent DTMF decoder 520 from being able to detect and/or decode DTMF information in unprocessed session 555. As a result, signal enhancement module 510 modifies location message 25 to eliminate particular types of degradation, producing processed session 565. The contents and operation of a particular embodiment of signal enhancement module 510 are illustrated in FIG. 6.

After reducing or eliminating the degradation of unprocessed session 555, signal enhancement module 510 transmits processed session 565 to DTMF decoder 520. DTMF decoder 520 detects and decodes DTMF signals in processed session 565. DTMF decoder 520 then transmits decoded values 575 to translator 530. DTMF decoder may use conventional DTMF decoding techniques or any other appropriate techniques to decode DTMF signals in processed session 565. In the illustrated embodiment, processed session 565 includes location message 25 representing a series of conventional DTMF tone pairs, each pair representing one of sixteen different values. In this embodiment, DTMF decoder 520 converts each of the DTMF tone pairs to the value associated with the tone pair.

Translator 530 receives decoded values 575 from DTMF decoder 520. Decoded values 575 may represent a file containing values, a stream of values, or values transmitted in any other appropriate form. Translator 530 uses the decoded values 575 to generate a location message 25. Location message 25 may also represent a text file, computer-readable data for use by a software application, or information in any other suitable format. Location message 25 includes the location of user 70. Location message 25 may provide the location of user 70 in the form of a latitude/longitude pair, a direction and distance from a reference point, driving directions to user 70, or any other appropriate form of location. Translator 530 then transmits location message 25 to operator 540 or a computer capable of displaying the location to operator 540 on a map.

Upon receiving location message 25, operator 540 takes appropriate steps to provide service to user 70 based on the characteristics of operator 540 and system 10 in general. For example, if operator 540 represents a human "911" dispatcher and location message 25 represents a text file, operator 540 may read location message 25 and then provide the location of user 70 to a mobile service unit, such as an ambulance. As another example, if operator 540 represents an automated direction-providing service and location message 25 represents data provided as input to a direction-generating software application, operator 540 may process the data and generate directions to a specified location. Operator 540 may then communicate the directions to communication device 30 through mobile communication network 50 and communication device 30.

System 10 contemplates any configuration of components in operator facility 60 appropriate based on the characteristics and requirements of system 10. For example, a particular system 10 may utilize position locator 60 capable of transmitting location message 25 in digitized speech. In such an embodiment, operator facility 60 may be configured to modify processed session 565 to compensate for any degradation occurring to location message 25 during transmission to operator facility 60, including types of degradation unique to digitized speech transmissions. As noted above, operator facility 60 may be configured to compensate for the degradation or alteration of the amplitude, phase, shape, and/or any other appropriate characteristics of signals included in location message 25. Additionally, system 10 may include position locator 20 capable of operating with embodiments of operator facility 60 other than that described. For example, a particular embodiment of position locator 20 may transmit location message 25 in a manner that prevents degradation and system 10 may not include operator facility 60 that provides the degradation eliminating functionality described above.

FIG. 6 is a block diagram illustrating the components of signal enhancement module 510 according to a particular embodiment. Signal enhancement module 510 reduces or eliminates degradation experienced by location message 25 while traversing system 10. Signal enhancement module 510 in a particular embodiment of system 10 may include components appropriate for addressing the degradation experienced by that particular embodiment of system 10. The illustrated embodiment of signal enhancement module 510 includes a bandpass filter 610 and an automatic gain control 620.

Bandpass filter 610 isolates audio signals having a frequency within the voiceband, 300–3500 Hertz. Bandpass filter 610 may represent any appropriate collection of discrete and/or integrated electronic components capable of filtering out portions of unprocessed session 555 that are outside the voiceband. Additionally, bandpass filter 610 may include any appropriate software necessary to provide the functionality described below.

Automatic gain control 620 normalizes the volume of input signals received by automatic gain control 620 so that output signals of automatic gain control 620 will all have a predetermined volume. Automatic gain control 620 also may represent any collection of hardware and/or software appropriate for providing the functionality described. In a particular embodiment, automatic gain control 602 may represent an array of eight gain control components with each gain control component responsible for processing signals at a particular DTMF frequency.

In particular embodiments of system 10, position locator generates location message 25 as audio signals that are broadcast to communication device 30. Transmission through the air between position locator 20 and communication device 30 may cause signal degradation of location message 25. In certain circumstances, this degradation may cause the volume of one tone in the tone pair to be amplified and the volume of the other tone to be diminished. Because the DTMF standard only requires detection of DTMF signals within a particular range of volumes, this degradation may prevent a standard DTMF decoder from being able to detect and/or decode DTMF information in unprocessed session 555 once degraded. To remedy this problem, the illustrated embodiment of signal enhancement module 510 normalizes the volume of all signals received by signal enhancement module within the voiceband. Normalization results in all tones having the same volume, a volume within the range allowed by the DTMF standard.

In operation, signal enhancement module 510 receives, as an input to bandpass filter 610, unprocessed session 555 from network interface 500. Diagram 630a illustrates the frequency domain characteristics of unprocessed session 555 when unprocessed session 555 enters signal enhancement module 510. As shown, in FIG. 6, unprocessed session 555 includes a tone pair signal 705 and noise 707 outside the voiceband as shown in Diagram 630a. The horizontal dotted-lines represent the minimum volume level 715 and maximum volume level 725 acceptable based on the DTMF standard, while the vertical dotted-lines represent the minimum frequency 725 and maximum frequency 735 within the voiceband.

Bandpass filter 610 filters out signal components of unprocessed session 555 that have a frequency outside the voiceband, such as noise 707, creating filtered session 655. Diagram 630b illustrates the frequency domain characteristics of filtered session 655 after passing through bandpass filter 610. Bandpass filter 610 then transmits filter session 655 to automatic gain control 620

Because the DTMF standard only requires detection of DTMF signals within a particular range of volumes, a signal pair in communication session 55 that experienced degradation during transmission may not be detected if the volume of either tone in the pair is too low or too high. Thus, in this embodiment, automatic gain control normalizes the volume of filtered session 655, producing enhanced session 665. As a result, all voiceband components of enhanced session 665 will have a volume within the minimum and maximum required by the DTMF standard and those components representing DTMF information will be detected by DTMF decoder 520. Diagram 630c illustrates the frequency domain characteristics of enhanced session 665 after passing through automatic gain control 620.

Figure 7:
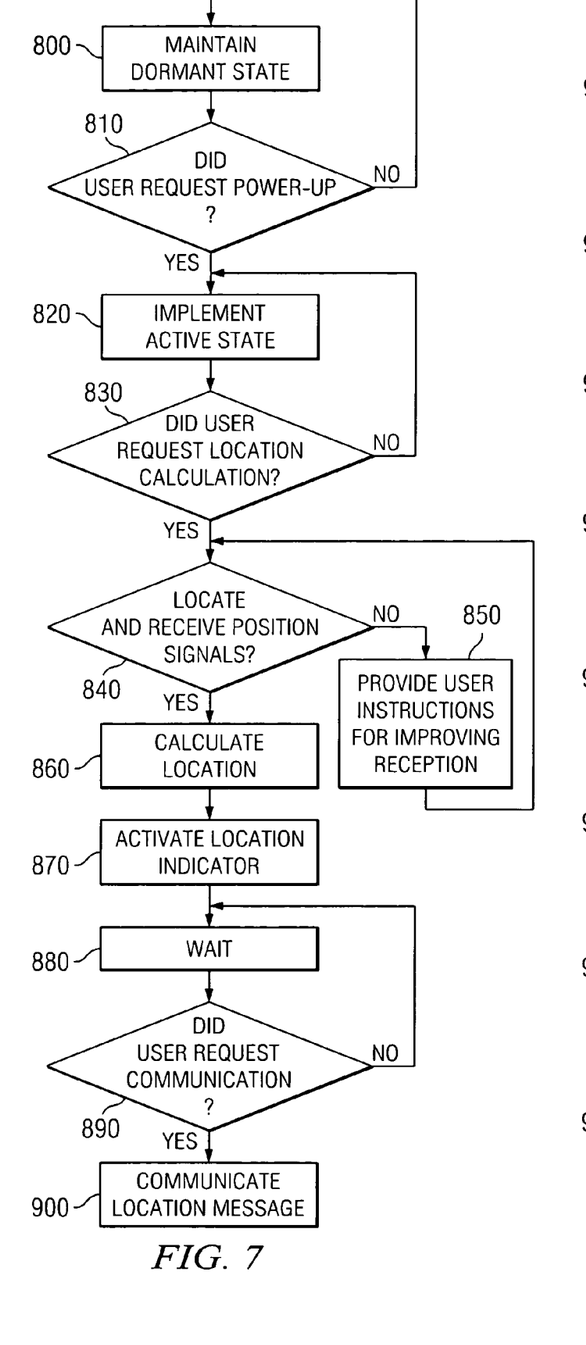
FIG. 7 illustrates operation of a particular embodiment of the signal enhancement module.

FIG. 7 is a flow chart detailing operation of position locator 20 according to a particular embodiment. Specifically, FIG. 7 describes operation of the embodiment of position locator 20 illustrated in FIG. 2. For the sake of this example, position locator 20 is assumed to begin operation in the dormant state. The description begins, at step 800, with position locator 20 in a dormant state, waiting for user 70 to request power-up. At step 810, position locator 20 determines whether position locator 20 has received a power-up request. If so, position locator 20 stays in the dormant step at step 800.

If a user has requested power-up, position locator 20 transitions to an active state at step 820. At step 830, position locator 20 determines whether user 70 has requested a location calculation. If not, position locator 20 returns to step 820 and maintains the active state.

If user 70 has made a calculation request, position locator 20 determines whether position locator 20 can receive position signals 45 from positioning system 40 at step 840. If not, position locator 20 provides user 70 instructions or other information for improving reception of position signals 45 at step 850.

Once position locator 20 is able to receive position signals 45, position locator 20 calculates the location of position locator 20 using information from position signals 45 at step 860. At step 870, position locator 20 activates location indicator 150. Position locator 20 then waits until receiving a transmission request at step 880. At step 890, position locator 20 determines whether position locator 20 has received a transmission request. If not, position locator 20 continues to wait at step 880. If so, position locator 20 communicates location message 25 at step 900.

Figure 8:
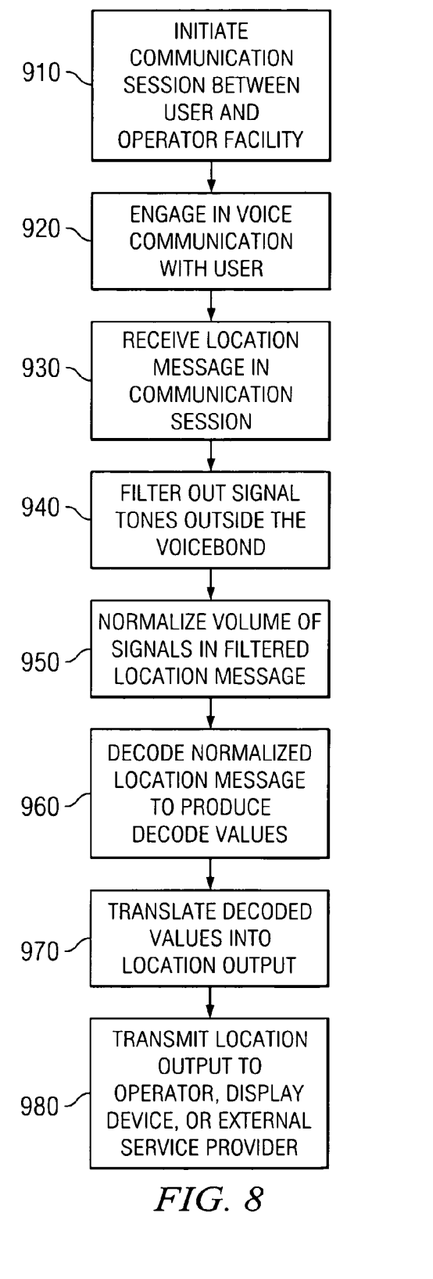
FIG. 8 is a flow chart illustrating operation of a particular embodiment of the position locator.

FIG. 8 is a flow chart illustrating operation of one embodiment of operator facility 60. The flow chart details operation of the embodiments of operator facility 60 and signal enhancement module 510 illustrated in FIGS. 5–6. Specifically, the operator facility 60 described includes signal enhancement module 510 configured to enhance signals in communication session 55 by normalizing the volume of signals with a frequency within the voiceband.

At step 910, user 70 and operator facility 60 initiate a communication session 55. User 70 and operator facility 60 engage in voice communication through communication session 55 at step 920. At an appropriate time, operator facility 60 receives location message 25 through communication session 55 at step 930. At step 940, operator facility 60 filters out signals in communication session 55 that have a frequency outside the voiceband. Operator facility 60 then normalizes the volume of signals in filtered communication session 55 including the DTMF information in location message 25 at step 950. At step 960, operator facility 60 decodes the DTMF values in normalized communication session 55 to produce decoded values 575. Operator facility 60 then translates decoded values 575 into location output 550 at step 970. At step 980, operator facility 60 then transmits location output 550 to an external operator or uses location output 550 to facilitate the provision of services to user 70.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for determining the location of a mobile device comprising:

receiving a location message from a communication network, wherein the location message comprises a plurality of signal tones;

modifying a selected subset of the plurality of signal tones, wherein the selected subset comprises signal tones having a frequency within a predetermined range of frequencies;

decoding the modified signal tones into a plurality of decoded values; and determining a location of a user based on at least the plurality of decoded values.

2. The method of claim 1, wherein modifying the selected subset of the plurality of signal tones comprises setting a volume of the signal tones in the selected subset to a predetermined value.

3. The method of claim 1, wherein modifying the selected subset of the plurality of signal tones comprises:
   increasing a volume of each signal tone in the selected subset for which the volume is below a predetermined minimum; and
   decreasing a volume of each signal tone in the selected subset for which the volume is above a predetermined maximum.

4. The method of claim 1, wherein determining a location comprises:
   determining the location of the user based on at least the plurality of decoded values, and
   generating a location output that includes the location of the user and conforms to National Marine Electronics Association Standard 1083 ("NMEA-1083").

5. The method of claim 1, wherein determining a location comprises:
   determining the location of the user based on at least the plurality of values, and
   generating a location output that includes the location of the user and conforms to the SiRF binary protocol.

6. The method of claim 1, wherein the predetermined range of frequencies includes only frequencies between 300 and 3500 Hz.

7. The method of claim 1, wherein the plurality of signal tones comprise a plurality of Dual Tone Multifrequency (DTMF) tones, the DTMF tones identifying the location of a position locating device communicated through a mobile communication device.

8. The method of claim 1, wherein the location message comprises a plurality of DTMF tones and wherein receiving a location message comprises:
   receiving voice communication on a voice channel established between the user and the operator, and
   receiving simultaneously the location message on the voice channel.

9. A device for determining the location of a communication device comprising:
   a network interface that receives a location message comprising a plurality of signal tones;
   a signal enhancement module that modifies a selected subset of the plurality of signal tones, wherein the selected subset comprises signal tones having a frequency within a predetermined range of frequencies;
   a tone decoder that decodes the modified signal tones into a plurality of decoded values; and
   a translator that determines a location of a user based on at least the decoded values.

10. The device of claim 9, wherein the signal enhancement module modifies the selected subset of the plurality of signal tones by setting a volume of all the signal tones in the selected subset to a predetermined value.

11. The device of claim 9, wherein the signal enhancement module modifies the selected subset of the plurality of signal tones by:
   increasing a volume of each signal tone in the selected subset for which the volume is below a predetermined minimum; and
   decreasing a volume of each signal tone in the selected subset for which the volume is above a predetermined maximum.

12. The device of claim 9, wherein the translator determines the location by:
   determining the location of the user based on at least the plurality of decoded values, and
   generating a location output that includes the location of the user and that conforms to National Marine Electronics Association Standard 1083 ("NMEA-1083").

13. The device of claim 9, wherein the translator determines the location by:
   determining the location of the user based on at least the plurality of values, and
   generating a location output that includes the location of the user and that conforms to the SiRF binary protocol.

14. The device of claim 9, wherein the predetermined range of frequencies includes only frequencies between 300 and 3500 Hz.

15. The device of claim 9, wherein the plurality of signal tones comprise a plurality of Dual Tone Multifrequency (DTMF) tones, the DTMF tones identifying the location of a position locating device communicated through a mobile communication device.

16. The device of claim 9, wherein the location message comprises a plurality of DTMF tones and wherein the network interface receives a location message by:
   receiving voice communication on a voice channel established between the user and the operator; and
   receiving simultaneously the location message on the voice channel.

17. A computer program stored on a computer readable medium, wherein the computer program, when executed:
   receives a location message from a communication network, wherein the location message comprises a plurality of signal tones;
   modifies a selected subset of the plurality of signal tones, wherein the selected subset comprises signal tones having a frequency within a predetermined range of frequencies; and
   decodes the modified signal tones into a plurality of decoded values; and
   determines a location of a user based on at least the plurality of decoded values.

18. The computer program of claim 17, wherein the computer program modifies the selected subset of the plurality of signal tones by setting a volume of the signal tones in the selected subset to a predetermined value.

19. The computer program of claim 17, wherein the computer program modifies the selected subset of the plurality of signal tones by:
   increasing a volume of each signal tone in the selected subset for which the volume is below a predetermined minimum; and
   decreasing a volume of each signal tone in the selected subset for which the volume is above a predetermined maximum.

20. The computer program of claim 17, wherein the computer program determines the location by:
   determining the location of the user based on at least the plurality of decoded values, and
   generating a location output that includes the location of the user and conforms to National Marine Electronics Association Standard 1083 ("NMEA-1083").

21. The computer program of claim 17, wherein the computer program determines the location by:
   determining the location of the user based on at least the plurality of values, and generating a location output that includes the location of the user and conforms to the SiRF binary protocol.

22. The computer program of claim 17, wherein the predetermined range of frequencies includes only frequencies between 300 and 3500 Hz.

23. The computer program of claim 17, wherein the plurality of signal tones comprise a plurality of Dual Tone Multifrequency (DTMF) tones, the DTMF tones identifying the location of a position locating device communicated through a mobile communication device.

24. The computer program of claim 17, wherein the location message comprises a plurality of DTMF tones and wherein the computer program receives the location message by:

receiving voice communication on a voice channel established between the user and the operator, and receiving simultaneously the location message on the voice channel.

\* \* \* \* \*